United States Patent
Feenstra et al.

(10) Patent No.: US 10,120,183 B2
(45) Date of Patent: *Nov. 6, 2018

(54) DISPLAY DEVICE

(71) Applicant: Amazon Technologies, Inc., Seattle, WA (US)

(72) Inventors: Bokke Johannes Feenstra, Nuenen (NL); Robert Andrew Hayes, Eindhoven (NL); Ivo Godfried Jozef Camps, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 409 days.

This patent is subject to a terminal disclaimer.

(21) Appl. No.: 14/804,066

(22) Filed: Jul. 20, 2015

(65) Prior Publication Data

US 2016/0018634 A1 Jan. 21, 2016

Related U.S. Application Data

(63) Continuation of application No. 11/816,716, filed as application No. PCT/IB2006/050528 on Feb. 17, 2006, now Pat. No. 9,086,565.

(30) Foreign Application Priority Data

Feb. 28, 2005 (EP) .................................... 05101497

(51) Int. Cl.
*G02B 26/00* (2006.01)
*G02F 1/03* (2006.01)
(Continued)

(52) U.S. Cl.
CPC ......... *G02B 26/005* (2013.01); *G02B 26/004* (2013.01); *G02B 26/007* (2013.01); *G02B 5/0284* (2013.01)

(58) Field of Classification Search
CPC ... G02F 1/133; G02F 1/29; G02F 1/01; G02F 1/03; G02F 1/15; G02F 1/155;
(Continued)

(56) References Cited

U.S. PATENT DOCUMENTS

| 5,181,016 A | 1/1993 | Lee | |
| 2005/0151709 A1* | 7/2005 | Jacobson | G02B 26/005 345/84 |

(Continued)

FOREIGN PATENT DOCUMENTS

| EP | 1310809 A2 | 5/2003 |
| WO | WO03000196 A2 | 1/2003 |

(Continued)

OTHER PUBLICATIONS

Hayes et al., "Video-Speed Electronic Paper Based on Electrowetting" Nature, Nature Publishing Group, London, GB, vol. 425, No. 6956, Sep. 25, 2003, pp. 383-385.

(Continued)

*Primary Examiner* — Dawayne A Pinkney
(74) *Attorney, Agent, or Firm* — EIP US LLP

(57) ABSTRACT

A display device or optical switch, based on layer break up or layer displacement having at least two different states, in which one fluid, e.g., oil, in a first state adjoins at least a first support plate, and in a second state another fluid at least partly adjoins the first support plate. Sub-picture elements are separated by areas having a hydrophilic surface.

17 Claims, 4 Drawing Sheets

(51) Int. Cl.
*G02F 1/29* (2006.01)
*G02B 5/02* (2006.01)

(58) Field of Classification Search
CPC .......... G02F 1/153; G02B 5/23; G02B 26/00; G02B 26/08; G02B 1/06
USPC ........ 359/290–293, 295, 315–316, 276, 238, 359/245, 242, 259, 244, 253–254, 359/265–275, 665–667, 223–225, 243, 359/260–263
See application file for complete search history.

(56) References Cited

U.S. PATENT DOCUMENTS

| | | | |
|---|---|---|---|
| 2006/0132404 A1 | 6/2006 | Hayes et al. | |
| 2007/0152956 A1* | 7/2007 | Danner | G02F 1/161 345/107 |
| 2008/0297880 A1* | 12/2008 | Steckl | G02B 26/004 359/291 |

FOREIGN PATENT DOCUMENTS

| | | |
|---|---|---|
| WO | WO03071346 A1 | 8/2003 |
| WO | WO2004068208 A1 | 8/2004 |
| WO | WO2004077124 A1 | 9/2004 |
| WO | WO2004104670 A1 | 12/2004 |
| WO | WO2006000945 A1 | 1/2006 |

OTHER PUBLICATIONS

Office Action for U.S. Appl. No. 11/816,716, dated Nov. 27, 2013, Bakke Johannes Feenstra, "Display Device", 9 pages.
Final Office Action for U.S. Appl. No. 11/816,716, dated Jun. 5, 2014, Bokke Johannes Feenstra, "Display Device", 9 pages.
Roques-Carmes et al., "Liquid behavior inside a reflective display pixel based on electrowetting", Journal of Applied Physics, American Institute of Physics, New York, vol. 95, No. 8, Apr. 15, 2004, pp. 4389-4396.

* cited by examiner

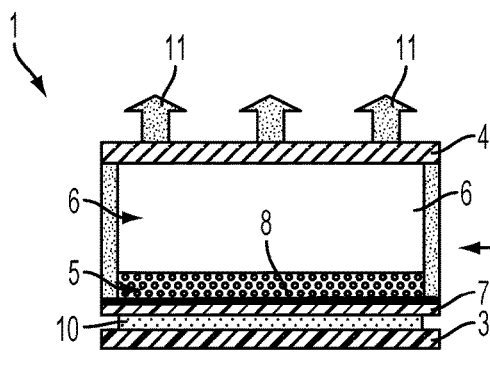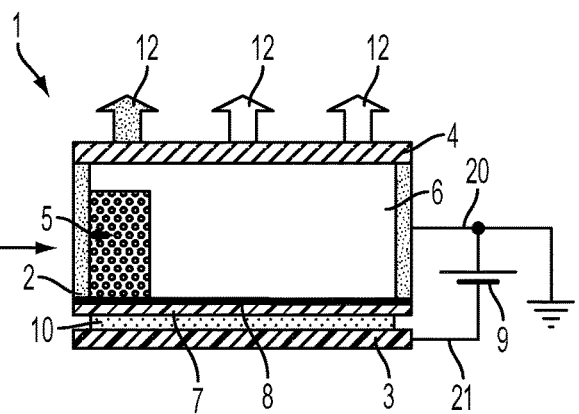
FIG. 1A  FIG. 1B
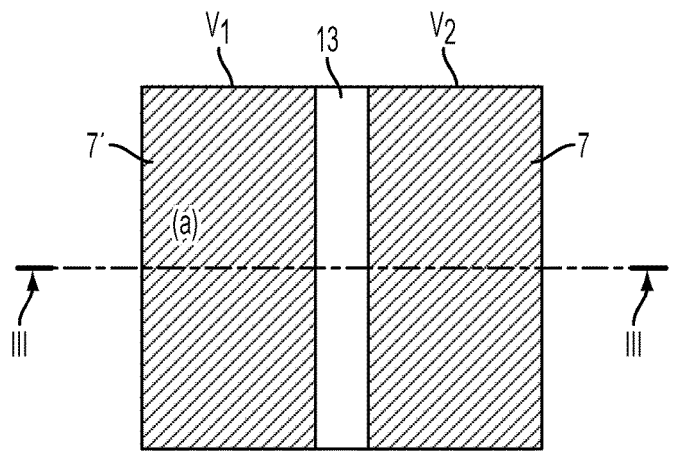
FIG. 2
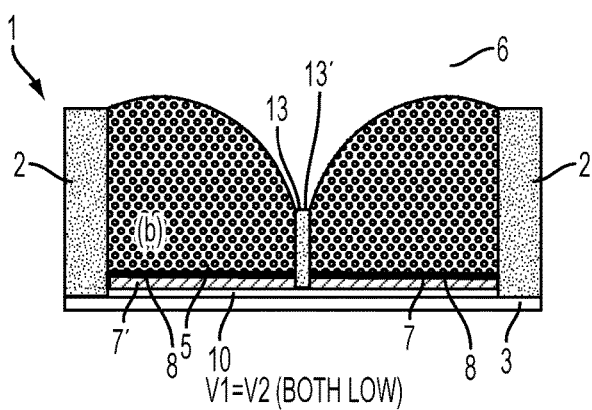
FIG. 3

DISPLAY DEVICE

CROSS REFERENCE TO RELATED APPLICATIONS

This disclosure is a continuation of and claims priority to U.S. patent application Ser. No. 11/816,716, filed Aug. 21, 2007, which is a 35 U.S.C. 371 national stage application of International Application No. PCT/IB2006/050528, filed Feb. 17, 2006, which claims priority to European Patent Application No. 05101497.5, filed Feb. 28, 2005, the entire contents of which are incorporated herein by reference.

BACKGROUND

The invention relates to a display device comprising picture elements, each picture element having at least one first fluid and a second fluid immiscible with each other within a space between a first support plate and a second support plate, the second fluid being electroconductive or polar.

Display devices like TFT-LCDs are used in laptop computers and in organizers, but also find an increasingly wider application in GSM telephones. Instead of LCDs, for example, (polymer) LED display devices are also being used.

Apart from these display effects that are well established by now other display techniques are evolving like electrophoretic displays, which are suitable for paper white applications.

More generally the invention relates to an optical switch comprising at least one first fluid and a second fluid immiscible with each other within a space between a first support plate and a second support plate, the second fluid being electroconductive or polar.

Optical switches may be used in shutter applications, diaphragms, but also in switchable color filters in e.g. display applications.

SUMMARY

The invention is based on a principle called electrowetting. The invention provides new ways of using this principle in which one of the fluids in a first state adjoins a greater part of the first support plate and in the second state the other fluid at least partly adjoins the first support plate.

If for instance a (first) fluid is a (colored) oil and the second (the other) fluid is water (due to interfacial tensions) a two layer system is provided which comprises a water layer and an oil layer. However, if a voltage is applied between the water and an electrode on the first support plate the oil layer moves aside or breaks up due to electrostatic forces. Since parts of the water now penetrate the oil layer the picture element becomes partly transparent. When a (diffuse) reflector is positioned below the oil in or under the picture element a reflective display is realized.

Display devices based on this principle have been described in PCT-Application WO 03/00196 (PH-NL 02.0129). In all embodiments shown in this Application picture elements are described in which the picture element walls do not extend across the whole picture element thickness and in the second state the other fluid substantially completely adjoins the first support plate. Embodiments, not shown in this Application, where a picture element (pixel) can correspond to a defined space (e.g., a substantially closed space) are also possible.

Said display devices have low power consumption due to the low leakage current in the state when the voltage is applied. However, in some applications, such as an e-book, ultra-low power consumption is desired. Also an increasing need exists for reflective displays in these applications having intermediate transmission or reflection values (grayvalues).

It is one of the objects of the present invention to overcome at least partly the above-mentioned problems.

To this end, according to the invention, the device is provided on a first support plate, within a picture area, with barriers separating the first fluid to define sub-picture elements, the first support plate comprising an electrode for each sub-picture element. If a barrier is incorporated within a picture element (pixel) that prevents oil motion without the application of a (local) voltage hi-stability is incorporated in the system, i.e. the optical state of the system is unchanged, even when the voltage is removed. In this way power consumption is reduced.

In a preferred embodiment the barriers comprise more wettable surfaces provided on walls.

One of the further advantages of bi-stability, next to the use of reduced power, is the possibility of obtaining grayvalues by dividing the area of the picture element into different areas, be it that said method for obtaining grayvalues in bi-stable display devices per se is known in the art.

A further preferred embodiment of the invention however offers the possibility of obtaining analogue gray-scales by applying to one of the electrodes pulsed high voltage, the pulse being shorter than the time required for the oil to move across the barrier entirely.

These and other aspects of the invention are apparent from and will be elucidated with reference to the embodiments described hereinafter.

BRIEF DESCRIPTION OF THE DRAWINGS

In the drawings:

FIGS. 1A and 1B are diagrammatic cross-sections of a part of a display device, to show the principle on which a display device according to the invention is based, FIG. 2 is a plan view of a part of a display device according to the invention, while FIGS. 3-7 are diagrammatic cross-sections along line III-III in FIG. 2 at various driving conditions and FIGS. 8-11 are plan view of parts of other display devices according to the invention.

The figures are diagrammatic and not drawn to scale. Corresponding elements are generally denoted by the same reference numerals.

DETAILED DESCRIPTION

Figure 4:
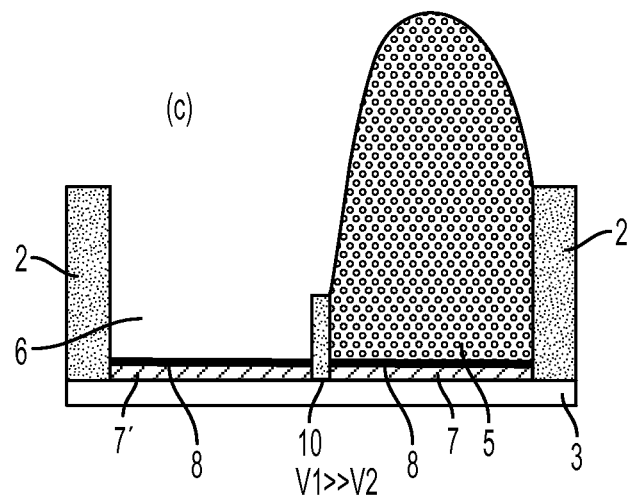
Figure 5:
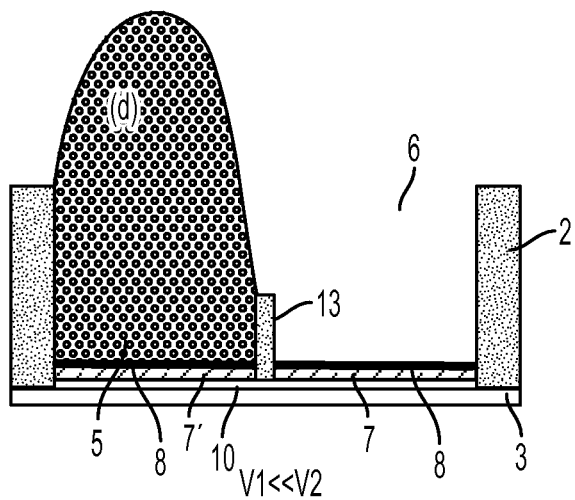

FIGS. 1A and 1B show diagrammatic cross-sections of a part of a display device 1, e.g. one picture element, which shows the principle on which a display device according to the invention is based. Between two transparent substrates or support plates 3, 4, and between pixel walls 2, a first fluid 5 and a second fluid 6 are provided, which are immiscible with each other. The first fluid 5 is for instance an alkane like hexadecane or as in this example, a (silicone) oil. The second fluid 6 is electroconductive or polar, for instance water or a salt solution (e.g. a solution of KCl in a mixture of water and ethyl alcohol). By means of a reflecting layer 10 positioned below the oil in this example below the transparent electrode 7, a reflective display picture element is realized.

In a first state, when no external voltage is applied (FIG. 1A) the fluids 5, 6 adjoin the first and second transparent support plates 3, 4 of e.g. glass or plastic. On the first support plate 3 the transparent electrode 7, for example indium (tin) oxide is provided and an intermediate less wettable (hydrophobic) layer 8, in this example an amorphous fluoropolymer (AF1600). Due to the presence of the oil over the whole area of the picture element appears black (arrows 11).

When a voltage is applied (voltage source 9) via interconnections 20, 21 the layer 5 moves aside or breaks up into small droplets (FIG. 1B). This occurs when the electrostatic energy gain is larger than the surface energy loss due to the creation of curved surfaces. In this case light is reflected at the main area of the picture element, while only a small part appears black (arrows 12).

FIG. 2 shows a plan view of a part of a display device according to the invention with the intermediate layer 8 removed for clarity, while FIGS. 3-7 show diagrammatic cross-sections along line III-III in FIG. 2. A further hydrophilic barrier or wall 13 is incorporated in a picture element that prevents oil motion in certain driving conditions.

The pixel walls 2 do not need to extend across the whole pixel thickness. The walls 2, 13 may be obtained by photolithography, offset printing or other printing techniques known in the art. The other reference numerals have the same meaning as those in FIGS. 1A and 1B.

The wall 13 in this example divides the picture element in two segments having equal size. In addition, the picture element comprises two electrodes 7, 7' of equal size that can be addressed individually. For said wall 13 (which is chosen to be as narrow as possible) a material is chosen such that it is hydrophilic, which implies that the oil 5 is prevented from wetting the barrier, particular from wetting the top of said barrier. The latter can be achieved by providing the top of the barrier or wall 13 with a more wettable surface 13'. At the same time it is chosen to be less hydrophilic than the material of the pixel walls 2. This has the effect that applying a voltage to either or both of the electrodes 7, 7' will cause the oil to move to one of the neighboring sub-picture elements. All voltages in the examples discussed below are chosen with respect to a ground potential applied to the second fluid 6.

In FIG. 3 the oil 5 is distributed evenly over both picture element parts. This is achieved when V1 (applied to electrode 7) and V2 (applied to electrode 7') are equal and both have a small magnitude.

Fixing the oil on the sides of the wall 13 is sufficiently strong to ensure separation of the two oil volumes. However, when either V1 or V2 is increased, at some point, the oil will want to wet the barrier, since at the area of the electrode having a higher voltage, the intermediate layer 8 becomes more hydrophilic than the wall 13 itself. As a result, the oil will move across the wall 13 to the other side, resulting in the situation sketched in FIG. 4 (V1>>V2) or FIG. 5 (V1<<V2).

Figure 6:
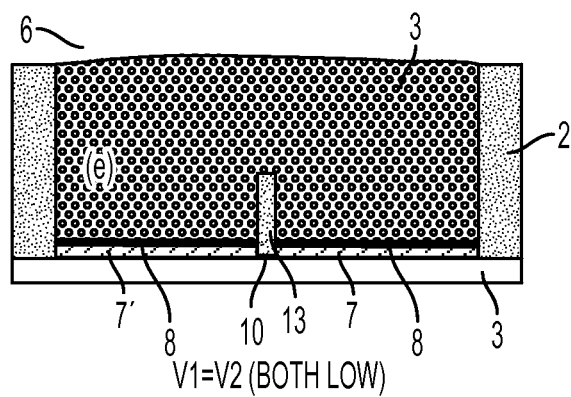

To reset the picture element in the fully dark state (the state where the oil is distributed evenly as shown in FIG. 6) a high voltage is applied to both sub-picture elements, such that the surface underlying the picture element becomes more hydrophilic than the wall 13. As a result, the oil 5 will move over the wall 13, and re-distribute itself over the entire picture element as in FIG. 6. Removing the voltage will split the oil layer at the wall 13, since this is now more hydrophilic than the surface underlying the picture element. The electrode configuration chosen here is merely an example. By choosing equal areas for the electrodes 7, 7' the situations of both FIG. 5 and FIG. 6 in fact have similar reflection (or transmission) properties, viz. mid-gray.

Figure 7:
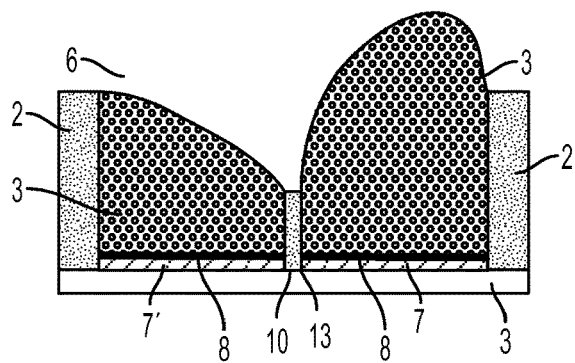

FIG. 7 shows how stable gray values in an analogue gray-scale are obtained by using timing. If in the situation shown in FIG. 3 a pulsed high voltage is applied to one of the electrodes 7, 7', the pulse being shorter than the time required for the oil to move across the wall 13 entirely, at the end state the oil film is thicker in one part of the picture element than in the other. Since the nominal thickness of the film is such that about 1% of the light is reflected, the reflectivity cannot be reduced much further in the part where the film has become thicker. However, the reflectivity of the part where the oil film has become thinner will be increased significantly, resulting in an overall increase of reflectivity of the picture element. Depending on the pulse length compared to the time it takes for the oil to move, stable gray-values in an analogue gray-scale are obtained in this way.

The electrode configuration chosen here is merely an example. Other electrode configurations can be chosen, such as a circular geometry. The area of the two pixel parts can be different, resulting in multiple gray values.

Figure 8:
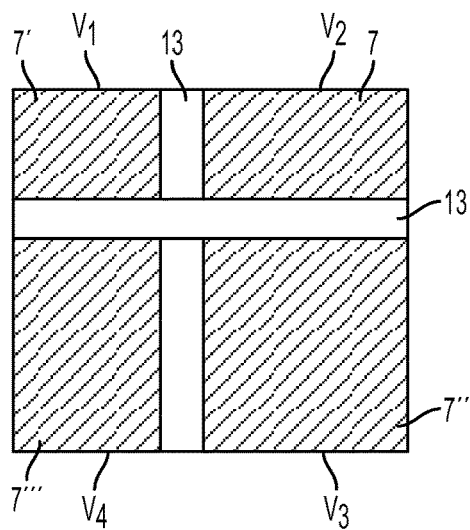
Figure 9:
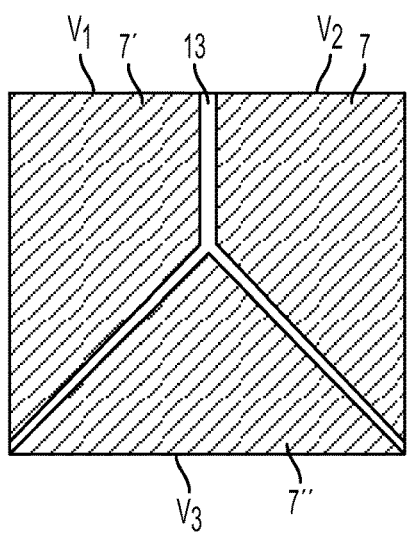
Figure 10:
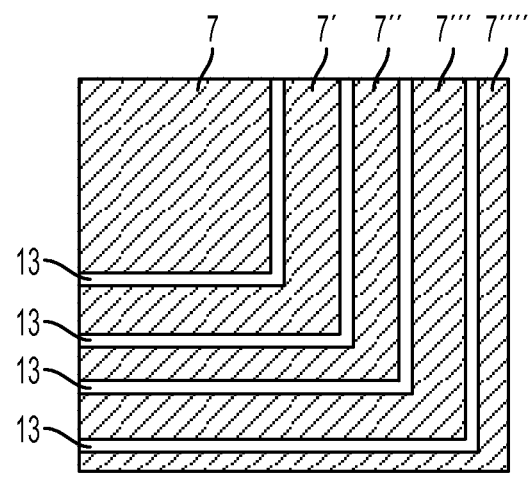
Figure 11:
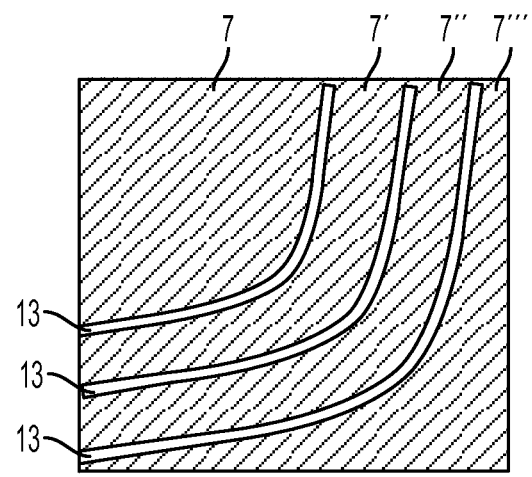

FIG. 8 shows an electrode configuration in which the picture element area has been divided into four parts 7, 7,' 7", 7''' having a certain area ratio and are driven by voltages V1, V2, V3, V4. FIG. 9 shows an electrode configuration in which the picture element area has been divided into three parts 7, 7,' 7" having another area ratio and are driven by voltages V1, V2 and V3. FIG. 10 shows an electrode configuration having a central picture element area 7 being enclosed by successive picture element area parts 7', 7", 7'''. The parts do not necessarily have to be square or rectangular, as shown in FIG. 11. FIGS. 8-11 have the intermediate layer 8 removed for clarity.

Several variations to the principle are possible. Although a reflective device has been described, the display may be made transmissive. Also the height of the walls 13 may be varied and said wall may have for instance a curved surface. Modifying the height will modify the curvature of the oil in the fixed states, so it will influence the required voltages and the stability of the states. If the material of the barriers 13 is the same as the material used for the pixel walls 2 they are equally hydrophilic as the pixel wall, and now the height of the barrier 13 (which is always lower than the pixel wall and may even be zero, which possibly requires a rather strong hydrophilicity at the position of dividing sub-picture elements, possibly even stronger than the one of the pixel wall 2) is the parameter determining the picture element dynamics. In this case, the volume of the oil compared to the picture element size will play an important role. There should be sufficient oil to make the oil fill the whole picture element, i.e. cross the lower barrier in case both electrodes are switched to a high voltage.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

What is claimed is:

1. An electrowetting display comprising:
a first support plate and a second support plate;
a pixel comprising:

a first fluid and a second fluid between the first support plate and the second support plate, wherein the first fluid is substantially immiscible with the second fluid;

a first sub-pixel comprising:
  a first electrode overlapping a first portion of the first support plate, for application of a first voltage between the first electrode and the second fluid:

a second sub-pixel comprising:
  a second electrode overlapping a second portion of the first support plate, for application of a second voltage between the second electrode and the second fluid, the second electrode not overlapping the first electrode; and a barrier located at least partly between the first and second sub-pixels, wherein the pixel is switchable from a first state to a second state such that:
  in the first state, the first fluid comprises two volumes in response to application of the first voltage and application of the second voltage, wherein a first volume of the two volumes is located within the first sub-pixel and a second volume of the two volumes is located within the second sub-pixel, the first volume and the second volume of the first fluid each having the same color, and
  in the second state, one of (i) the first volume of the two volumes or (ii) the second volume of the two volumes has moved across the barrier in response to an increase in magnitude of one of the first voltage or the second voltage.

2. The electrowetting display of claim 1, wherein the barrier comprises a material that is less hydrophilic than a material of which a pixel wall is comprised.

3. The electrowetting display of claim 1, further comprising a diffuse reflector.

4. The electrowetting display of claim 1, wherein one of (i) the first voltage or (ii) the second voltage is pulsed.

5. The electrowetting display of claim 1, wherein the first fluid comprises a colored oil.

6. The electrowetting display of claim 1, wherein the pixel comprises a third sub-pixel.

7. The electrowetting display of claim 1, wherein the pixel comprises a third sub-pixel and a fourth sub-pixel.

8. The electrowetting display of claim 1, wherein the barrier is one of (i) straight or (ii) curved.

9. The electrowetting display of claim 1, further comprising a voltage source that supplies the first and second voltages.

10. The electrowetting display of claim 1, wherein the first fluid comprises an oil and the second fluid comprises a solution that is at least one of electroconductive or polar, and wherein a surface area of the first sub-pixel is less hydrophilic and is separated from other sub-pixels by areas having a more hydrophilic surface area than the surface area of the first sub-pixel.

11. The electrowetting display of claim 1, wherein the first fluid comprises an oil and the second fluid comprises a solution that is at least one of electroconductive or polar, and wherein the barrier comprises surfaces that are more hydrophilic than respective surface areas of the first sub-pixel and the second sub-pixel.

12. The electrowetting display of claim 1, wherein the barrier has a height less than a height of a pixel wall.

13. The electrowetting display of claim 1, wherein a surface of the barrier is more hydrophilic than a surface of a pixel wall.

14. The electrowetting display of claim 1, further comprising a voltage source,
  wherein the first fluid comprises an oil and the second fluid comprises a solution that is at least one of electroconductive or polar, wherein during operation of the electrowetting display, a pulsed voltage is applied to one of the first electrode or the second electrode by the voltage source, and wherein a pulse of the pulsed voltage has a duration that is shorter than a time required for one of the first volume or the second volume to move across the barrier substantially entirely.

15. The electrowetting display of claim 1, wherein in the first state, the first and second voltages are substantially equal in magnitude.

16. The electrowetting display of claim 1, wherein a surface area of the first sub-pixel is less than a surface area of the second sub-pixel.

17. The electrowetting display of claim 1, wherein a shape of a surface area of the first sub-pixel is different from a shape of a surface area of the second sub-pixel.

* * * * *

UNITED STATES PATENT AND TRADEMARK OFFICE
CERTIFICATE OF CORRECTION

PATENT NO. : 10,120,183 B2
APPLICATION NO. : 14/804066
DATED : November 6, 2018
INVENTOR(S) : Feenstra et al.

Page 1 of 1

It is certified that error appears in the above-identified patent and that said Letters Patent is hereby corrected as shown below:

On the Title Page

On Page 2, item (56), under "OTHER PUBLICATIONS", in Column 2, Line 2, delete "Bakke" and insert -- Bokke --, therefor.

In the Claims

In Column 5, Line 8, in Claim 1, delete "second fluid:" and insert -- second fluid; --, therefor.

Signed and Sealed this
Twenty-third Day of April, 2019

Andrei Iancu
*Director of the United States Patent and Trademark Office*